(12) United States Patent
Nassor et al.

(10) Patent No.: US 8,181,077 B2
(45) Date of Patent: May 15, 2012

(54) METHODS AND DEVICES FOR THE DYNAMIC MANAGEMENT OF TRANSMISSION ERRORS BY NETWORK POINTS OF INTERCONNECTIONS

(75) Inventors: Eric Nassor, Thorigne Fouillard (FR); Karine Renout, Betton (FR)

(73) Assignee: Canon Kabushiki Kaisha, Tokyo (JP)

( * ) Notice: Subject to any disclaimer, the term of this patent is extended or adjusted under 35 U.S.C. 154(b) by 1194 days.

(21) Appl. No.: 11/940,631

(22) Filed: Nov. 15, 2007

(65) Prior Publication Data

US 2008/0123560 A1 May 29, 2008

(30) Foreign Application Priority Data

Nov. 27, 2006 (FR) ...................................... 06 55131

(51) Int. Cl.
*H04L 1/18* (2006.01)
*G08C 25/02* (2006.01)
*H03M 13/00* (2006.01)

(52) U.S. Cl. .......................................... 714/748; 714/776
(58) Field of Classification Search .................. 714/748, 714/769, 776

See application file for complete search history.

(56) References Cited

U.S. PATENT DOCUMENTS

| | | | |
|---|---|---|---|
| 5,457,701 A | | 10/1995 | Wasilewski et al. |
| 5,699,367 A | * | 12/1997 | Haartsen ........................ 714/749 |
| 5,844,918 A | * | 12/1998 | Kato .............................. 714/751 |
| 5,905,719 A | * | 5/1999 | Arnold et al. .................. 370/330 |
| 5,974,028 A | * | 10/1999 | Ramakrishnan ............... 370/229 |
| 6,553,533 B2 | * | 4/2003 | Demura et al. ................. 714/769 |
| 6,763,390 B1 | * | 7/2004 | Kovacevic et al. ............. 709/231 |
| 6,915,465 B2 | * | 7/2005 | Fujiwara et al. ............... 714/712 |
| 7,096,400 B2 | * | 8/2006 | Lim et al. ....................... 714/748 |
| 7,234,095 B2 | * | 6/2007 | Lee et al. ....................... 714/751 |
| 7,398,454 B2 | * | 7/2008 | Cai et al. ........................ 714/780 |
| 7,474,623 B2 | * | 1/2009 | Boyd et al. ..................... 370/242 |
| 7,613,977 B2 | * | 11/2009 | Shiizaki et al. ................ 714/748 |
| 7,634,816 B2 | * | 12/2009 | Alkove et al. .................... 726/27 |
| 7,720,096 B2 | * | 5/2010 | Klemets ......................... 370/466 |
| 7,769,880 B2 | * | 8/2010 | Paka et al. ...................... 709/231 |
| 2002/0099996 A1 | * | 7/2002 | Demura et al. ................ 714/769 |
| 2004/0184478 A1 | | 9/2004 | Donescu et al. |

(Continued)

FOREIGN PATENT DOCUMENTS

EP 1 271 830 A2 1/2003

(Continued)

OTHER PUBLICATIONS

French Search Report and Opinion, dated Jul. 13, 2007.

(Continued)

*Primary Examiner* — James C Kerveros
(74) *Attorney, Agent, or Firm* — Fitzpatrick, Cella, Harper & Scinto

(57) ABSTRACT

The disclosure describes transferring at least one data packet in a network from at least one server to a client through a point of interconnection. The point of interconnection executes a process of: receiving from the client at least one configuration map specifying at least one error correction mechanism, receiving from the server the at least one packet, detecting errors included in the at least one packet, and if the at least one packet includes at least one error, applying to the at least one packet at least one error correction mechanism specified in the at least one configuration map.

21 Claims, 9 Drawing Sheets

U.S. PATENT DOCUMENTS

| | | | |
|---|---|---|---|
| 2005/0044146 | A1 | 2/2005 | Nassor et al. |
| 2005/0044483 | A1 | 2/2005 | Maze et al. |
| 2005/0094667 | A1* | 5/2005 | Dahlman et al. ............. 370/473 |
| 2005/0114386 | A1 | 5/2005 | Nassor et al. |
| 2005/0198118 | A1 | 9/2005 | Viger et al. |
| 2005/0249240 | A1 | 11/2005 | Boyce et al. |
| 2005/0278389 | A1 | 12/2005 | Maze et al. |
| 2007/0033262 | A1 | 2/2007 | Labelle et al. |
| 2008/0084821 | A1 | 4/2008 | Maze et al. |

FOREIGN PATENT DOCUMENTS

| | | |
|---|---|---|
| EP | 1 422 892 A1 | 5/2004 |
| EP | 1 271 830 A3 | 7/2007 |
| WO | 95/19080 A1 | 7/1996 |
| WO | 97/24829 A1 | 7/1997 |
| WO | 2004/036760 A1 | 4/2004 |

OTHER PUBLICATIONS

E. Masala, et al., "MAC-Level Partial Checksum for H.264 Video Transmission over 802.11 Ad Hoc Wireless Networks", IEIIT-CNR, Issue Date: May 30-Jun. 1, 2005.

Ralf Koetter, et al., "Algebraic Soft-Decision Decoding of Reed-Solomon Codes", IEEE Transactions on Information Theory, vol. 49, No. 11, Nov. 2003.

Mostafa El-Khamy, et al., "Performance Enhancement for Algebraic Soft Decision Decoding of Reed-Dolomon Codes", ISIT 2004, Chicago, USA, Jun. 27-Jul. 2, 2004.

Mostafa El-Khamy, et al., "Iterative Algebraic Soft-Decision List Decoding of Reed-Solomon Codes", IEEE Journal on Selected Areas in Communications, vol. 24, No. 3, Mar. 2006.

* cited by examiner

C->M: DESCRIBE rtsp://foo/twister RTSP/1.0 ~701
    CSeq: 1

M->C: RTSP/1.0 200 OK ~702
    CSeq: 1
    Content-Type: application/sdp
    Content-Length: 164

707 { SDP {
    v=0
    o=- 2890844256 2890842807 IN IP4 172.16.2.93 ~707-1
    s=RTSP Session
    i=An Example of RTSP Session Usage
    a=control:rtsp://foo/twister
    t=0 0
    m=audio 8000 RTP/AVP 0
    a=control:rtsp://foo/twister/audio.en
    m=audio 21010 RTP/AVP 0 ~707-2
    a=control:rtsp://foo/twister/audio.fr
    m=video 61010 RTP/AVP 26
    a=control:rtsp://foo/twister/video
}

C->M: SETUP rtsp://foo/twister/audio.en RTSP/1.0 ~703
    CSeq: 2
    Transport: RTP/AVP;unicast;client_port=8000-8001

M->C: RTSP/1.0 200 OK ~704
    CSeq: 2
    Transport: RTP/AVP;unicast;client_port=8000-8001;
        server_port=9000-9001; ssrc=4700676E
    Session: 12345678                                           ~708

C->M: SETUP rtsp://foo/twister/video RTSP/1.0 ~705
    CSeq: 3
    Transport: RTP/AVP;unicast;client_port=61010-61011
    Session: 12345678

M->C: RTSP/1.0 200 OK ~706
    CSeq: 3
    Transport: RTP/AVP;unicast;client_port=61010-61011;
        server_port=9004-9005; ssrc=4700672D
    Session: 12345678                                           ~709

Fig. 7a

METHODS AND DEVICES FOR THE DYNAMIC MANAGEMENT OF TRANSMISSION ERRORS BY NETWORK POINTS OF INTERCONNECTIONS

BACKGROUND

The present invention relates to communications on heterogeneous networks, cable and wireless, and more particularly to the dynamic configuration of the network points of interconnection for transmission error management.

The impairments and losses of information that arise during the transfer of data over a network may give rise to significant effects in the processing of data on the client side. Errors in the transmission of multimedia data may for example give rise to strong visual distortions on the presentation of the multimedia content transmitted.

The use of suitable error management mechanisms has proved necessary to maintain a certain quality of service, all the more so since the particular characteristics of wireless networks have shown the limits of existing mechanisms for cable networks based on static models such as the mechanisms called FEC (Forward Error Correction). This is because the static mechanisms based on the use of information redundancy in data packets prove to be all the more effective, the greater the redundancy introduced. Their use can therefore give rise to significant "overhead" and bandwidth reservation, although insufficient to correct errors generated by a wireless network and constant and therefore unsuited to the fluctuating conditions of wireless networks.

The dynamic error management mechanisms based on retransmission of the ARQ (Automatic Repeat reQuest) or Hybrid ARQ type, although potentially giving rise to unnecessary retransmissions, prove from this point of view to be more suitable.

However, even though these methods have in this context good results, they do have the drawback of causing the element applying the mechanism to ignore the erroneous data that may have not been fully corrected. However, some data, even erroneous, in particular for video streams, may prove useful to the client, in particular to decoders for which the even partial decoding of data make it possible to limit the distortions due to transmission error.

In a context of continuous and real-time transfer (streaming) of a multimedia stream, the streams pass in the form of packets from the server to the client. A deadline is associated with each packet: the packet must be transmitted in compliance with a maximum transmission time. In a system for continuous transfer in real time over heterogeneous networks, each packet transits over cable and wireless networks, before being finally routed to the client. The points of interconnection in the networks, referred to as PICs, receive the packets from one network and retransmit them over another. They thereby constitute major factors in the management of errors generated by the networks by implementing error management mechanisms (for example of the FEC, ARQ or hybrid ARQ type).

However, though the methods conventionally used at PICs for managing errors on wireless networks, of the ARQ or hybrid ARQ type, have good results, they do not make it possible to transmit to the client the erroneous data that it has not been possible to correct fully.

In addition, while the variations in the wireless network are frequent and have an influence on the nature and quantity of transmission errors, these mechanisms do not meet the requirement to be able to adapt the error management policy to the fluctuating transmission conditions and to the nature of the data transmitted.

It is therefore necessary to have available a mechanism for increasing the probability of distribution of significant data in its entirety and on time, by adapting to the variable conditions of the network the error management policy that the PIC must implement using known error detection and correction methods (for example FEC, ARQ and Hybrid ARQ) as a function of various criteria, defined dynamically from information on the networks and the errors observed and inherent in the nature of the data being managed.

The patent U.S. Pat. No. 5,457,701 describes a method for indicating to the client that an error that cannot be corrected by the network has occurred during the transfer of the data via heterogeneous networks in a multipoint communication system.

This system allows the detection of "irreparable" errors that cannot be corrected by the means available at the network. Bits are added by the server to each packet before it is transmitted, so as to reserve information space for error check. These bits are initialized by the server to their default value indicating the integrity of the data.

Thus, when during the transfer of the packet to the client an "irreparable" error is detected by a network point of interconnection, the bits provided for this purpose are modified for a predefined value indicating the impairment of the data.

The erroneous packet thus modified is then transmitted to the client in the original data stream. The client must, on receiving the data, examine the bits reserved for the error check in order to determine the integrity of the data received.

However, this mechanism is based on an identical error management policy for all the packets transferred, whatever their significance in the stream and the constraints relating to them (for example small latency time and high rate).

Moreover, this invention only partially exploits the error correction phase, implemented following the error detection, when it does not lead to the entire correction of the erroneous data. The mechanism described simply makes it possible to indicate that the error detected has not been able to be fully corrected, the data being subsequently transmitted to the client as they stand.

Finally, in this invention, the irreparable data identified by the value of the bits reserved for the error check are transmitted to the client in their original stream with the non-erroneous data, obliging the client to examine all the packets received in order to determine the appropriate processing. Such an invention therefore requires proprietary systems for the clients and servers.

The article entitled "*Link-level partial checksum for real-time video transmission over* 802.11 *Wireless networks*" by E. Masala, M. Bottero and J C De Martin (IEIIT-CNR di Torino, *Vehicular Technology Conference,* 2005, VTC 2005-Spring, 2005 IEEE 61st) describes a technique of developing the error detection process of the IEEE 802.11 standard in order to ensure better quality of the video stream exchanges over wireless networks, by enabling certain packets partially corrupted during their transfer over the network to be simply relayed by the PIC instead of being abandoned.

The study presented in this article concerns particularly the aptness of performing an error detection on all the data bits transferred. It reveals that the application of an error detection mechanism limited to the most pertinent data ensures better quality of data transfer in real time, the data of less importance being relayed to the client as they stand without error check.

The mechanism proposed that stems from this is based on the use of a partial check (checksum) allowing selective dynamic coverage of the data exchanged. When the PIC detects an error in the data area covered by the check, it implements a standard error correction mechanism of the ARQ type. If the area covered by the check cannot be entirely corrected during this phase, the packet is then abandoned. In the contrary case, the packet corrected on the area covered is transmitted to the client whatever the state of the non-covered data.

This mechanism is based on the change in the coverage of the data for the error detection.

SUMMARY

The invention makes it possible to resolve at least one of the problems disclosed above.

In particular, the invention tends to limit the impact of the transmission errors on the final rendering by transmitting to the client the erroneous data partially corrected as well as possible, during a selective error management process subordinated to constraints and criteria imposed dynamically by the client at the point of interconnection implementing the process, accompanied by supplementary information, relating in particular to the original error and data.

The object of the invention is thus a method for transferring at least one data packet in a network from at least one server to one client through a point of interconnection, this method comprising the following steps:

receiving from said client at least one configuration map specifying at least one error correction mechanism;
receiving from said server said at least one packet;
detecting the errors included in said at least one packet received; and,
if said at least one packet comprises at least one error, applying to said at least one packet at least one error correction mechanism specified in said at least one configuration map;

these steps being executed by the point of interconnection.

In particular an advantage of the invention concerns the specific constraints of each erroneous data item and the stream from which it comes. Each PIC detecting an error selectively applies, according to the constraints and criteria defined dynamically in the configuration map that the client previously transmitted to it, the appropriate error management mechanisms.

According to a particular embodiment, the method further comprises a step of transmitting to said client said packet to which said at least one error correction mechanism specified in said at least one configuration map has been applied if the result of this application has corrected said at least one error.

According to a particular embodiment, the method further comprises a step of selecting said at least one packet according to at least one criterion of selecting said configuration map, said application of said at least one error correction mechanism to said at least one packet being carried out if said at least one packet satisfies said at least one selection criterion. The invention thus allows a selective application of the error correction mechanisms.

Still according to a particular embodiment, if said packet comprising at least one error is not entirely corrected or if said packet received is not selected according to said at least one criterion of said configuration map, the method further comprises the following steps:

creating at least one new data packet comprising the data of said packet comprising at least one error, potentially partially corrected; and
transmitting said at least one created packet to said client.

The invention thus makes it possible to capitalize on the detection and error correction work carried out by the PIC. This data is transmitted to the client so that it is easily identifiable and can be ignored by the client without additional work.

Advantageously, said at least one created packet is transmitted on a particular stream, preferably identified in said at least one configuration map.

Advantageously, said at least one created packet comprises information relating to the detection or attempt at correction of said at least one error and to the identification of the data and their original stream, as specified in the configuration map. Said at least one criterion of said configuration map preferably comprises at least one stream identification. Likewise, said at least one criterion of said configuration map comprises at least one parameter relating to the nature of the data in the packets. Said at least one criterion of said configuration map also preferably comprises information adapted to check at least one error management mechanism.

If the error correction phase makes it possible to end up with only a partial correction of the data, it is the partially corrected data accompanied by supplementary information, relating in particular to the error, the correction obtained and the origin of the data, that are transmitted to the client, thus avoiding his having to re-perform the work already carried out by the PIC.

In a particular embodiment, the method further comprises the use of at least one default error correction mechanism if said at least one packet comprising at least one error does not belong to a stream specified in said configuration map.

The irreparable data is extracted from its original stream in order to be packaged in new packets accompanied by supplementary information relating in particular to the data itself, in particular its original stream and its sequence number, and to any partially corrected error, in particular the original FEC, the position and extent of the error on reception, the position and extent of the error after correction and the algorithm that led to the partial correction, according to the information supplied by the configuration map previously transmitted by the client. These packets are then transmitted in a new stream, dedicated to the transfer of erroneous data to the client and not belonging to the original multimedia sequence. This new stream can be ignored by the client if he does not have means or resources necessary for processing it. The invention can therefore be supported by standard clients and servers.

Another object of the invention is a storage medium for storing a computer program comprising instructions adapted to implement each of the steps of the method described above.

Another object of the invention is a method for receiving at least one data packet in a network comprising at least one point of interconnection, this method comprising the following steps:

defining at least one configuration map comprising at least information adapted to enhance data packets comprising errors that have been previously detected;
transmitting said at least one configuration map to said at least one point of interconnection;
receiving said at least one packet from said at least one point of interconnection; and,
processing said at least one received packet according to said information adapted to enhance data packets comprising errors that have been previously detected.

The invention thus makes it possible to capitalize on the detection and error correction work carried out by the PIC. This data received by the client is easily identifiable and can be ignored without additional work.

The use of constraints and criteria defined dynamically in the configuration map enables the client to receive data packets previously processed by the PIC in a suitable fashion.

Advantageously, the configuration map comprises information adapted to add to identified data packets, the method comprising a step of identifying said at least one received packet according to said information adapted to identify data packets, said at least one received packet being processed if said at least one received packet is identified.

Advantageously, said information adapted to identify data packets comprises an identifier of at least one additional stream in order to identify the data packets requiring adapted processing.

According to a particular embodiment, said at least one received packet comprises information relating to at least one detection or error correction mechanism previously used on some of the data of said at least one received packet according to said information adapted to enhance data packets comprising errors that have been previously detected.

Another object of the invention is a device for a point of interconnection for transferring at least one data packet in a network from at least one server to one client through said point of interconnection, this device comprising the following means:
   means for receiving from said client at least one configuration map specifying at least one error correction mechanism;
   means for receiving from said server said at least one packet;
   means for detecting errors in said at least one packet; and,
   means for applying to said at least one packet at least one error correction mechanism specified in said at least one configuration map if said at least one packet comprises at least one error.

According to a particular embodiment, the device further comprises means for transmitting to said client said packet, to which said at least one error correction mechanism specified in said at least one configuration map has been applied, if the result of this application has corrected said at least one error.

According to a particular embodiment, the device further comprises means for selecting said at least one packet according to at least one selection criterion of said at least one configuration map, said at least one error correction mechanism being applied to said at least one packet if said at least one packet is selected.

Still according to a particular embodiment, the device further comprises the following means:
   means for creating at least one new data packet comprising the data of said packet received and selected, comprising at least one error, if said packet received and selected comprising at least one error has not been entirely corrected; and
   means for transmitting said at least one created packet to said client.

Thus, if the error correction phase does not make it possible to end up with only a partial correction of the data, it is the partially corrected data accompanied by supplementary information, relating in particular to the error, the correction obtained and the origin of the data, that are transmitted to the client, thus avoiding his having to redo the work already carried out by the PIC.

The device according to the invention thus makes it possible to capitalize on the detection and error correction work carried out by the PIC.

Advantageously, said at least one created packet is transmitted on a particular stream, preferably identified in said at least one configuration map.

Still advantageously, said at least one created packet comprises information relating to the attempt at correcting said at least one error and to the identification of the data and their original stream.

Another object of the invention is a device for receiving at least one data packet in a network comprising at least one point of interconnection, this device comprising the following means:
   means for defining at least one configuration map comprising at least information adapted to enhance data packets comprising errors that have been previously detected;
   means for transmitting said at least one configuration map to said at least one point of interconnection;
   means for receiving said at least one packet from said at least one point of interconnection; and
   means for processing said at least one received packet according to said information adapted to enhance data packets comprising errors that have been previously been detected.

The invention thus makes it possible to limit the data losses, the erroneous data packets being transmitted to the end client.

According to a particular embodiment, said configuration map comprises information adapted to identify data packets, said device comprising means for identifying said at least one received packet according to said information adapted to identify data packets, said at least one received packet being processed if said at least one received packet is identified.

The invention also allows the transmission to the client of the partial error corrections obtained for the irreparable data, during the application of the appropriate error correction mechanisms on the PIC, so as to capitalize the work already carried out.

The invention also makes it possible to improve the final rendering of the data transmitted because of the lesser magnitude of the data losses, the data, even erroneous, also being transmitted to the client, and because of the partial correction provided by the PIC on the erroneous data, alleviating the error management task of the client.

The possibility of ignoring the stream dedicated to the erroneous data enables standard clients incapable of managing this type of stream and proprietary clients wishing to conserve their local resources for other requirements to process the original data streams issuing from a PIC implementing the invention.

The definition and the dynamic transmission by the client of the criteria and constraints of choice of the erroneous data for the application of error mechanisms and the definition and the dynamic transmission by the client of the nature of the private information to be associated with the erroneous data transmitted to the client, allow a dynamic adaptation of the processing carried out by the PIC of the data transmitted and enable the PICs to be upgraded for future requirements without major modification.

Finally, the absence of any modification on the server side allows the use of standard servers.

BRIEF DESCRIPTION OF THE DRAWINGS

Other advantages, aims and characteristics of the present invention will emerge from the following detailed description, given by way of non-limiting example, with regard to the accompanying drawings, in which:

FIG. 7, comprising FIGS. 7a and 7b, illustrates an example of configuration map instantiation for a given multimedia sequence.

DETAILED DESCRIPTION

Figure 1:
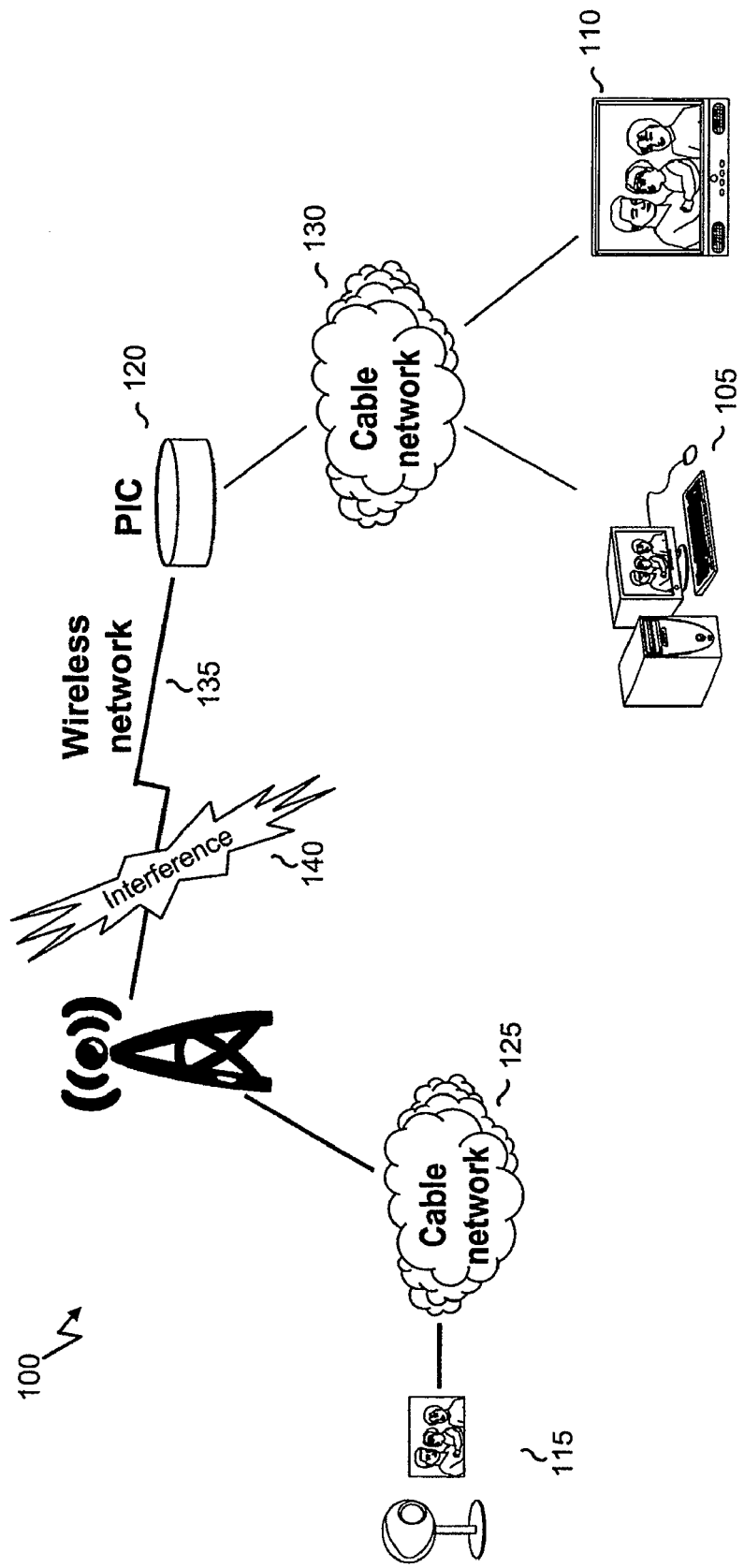
FIG. 1 depicts schematically an example of an environment for implementing the invention.

The invention is based in particular on the dynamic configuration of the PIC for managing errors generated during the transfer of data over unreliable networks, and on the transfer to the client of the erroneous data at best partially corrected.

According to the invention, the configuration map transmitted by the client to the PIC prior to any exchange of multimedia data and possibly during transfer thereof, specifies the error management policy to be applied to the erroneous data received, the supplementary information or "private information" that is to be transmitted to the client with the data at best partially corrected and possibly information on the supplementary stream dedicated to the transfer of the erroneous data to the client.

After having detected errors amongst the data received, the error management module of the PIC selects, according to the criteria defined in the configuration map, the erroneous data for which one or more error correction mechanisms must be implemented. The correction mechanisms specified are implemented on the selected data in order to obtain the best partial correction for the data that has not been able to be fully corrected.

A module for creating data packets ("packetization") is responsible for creating new packets from irreparable erroneous data, at best partially corrected, and corresponding private information as defined in the configuration map.

A transmission module is responsible for transmitting to the client the packets generated by the packet creation module from the erroneous data, in a dedicated stream not belonging to the initial multimedia sequence and whose characteristics can be defined in the configuration map.

Such a mechanism enables the PIC to selectively and dynamically manage the erroneous data received, in order to supply to the client, in a stream dedicated to the transfer of erroneous data, the best partial correction of the erroneous data that it has not been possible to fully correct.

The data and the associated information transmitted to the client in this context make it possible to limit the impacts due to the data losses on the final rendition whilst capitalizing on the error management work carried out in the PIC.

Thus the transmission of data according to the invention can be broken down into the following major phases:

1) The client, connected to a multimedia server via heterogeneous networks, cable and/or wireless, exchanges with this server, prior to any exchange of multimedia data, the description of the multimedia sequence that the client wishes to obtain.

2) The PIC through which the multimedia data exchanged between the client and the server will pass receives from the client, by virtue of known configuration techniques, a configuration map adapted to the management of errors for all or only some of the multimedia sequence streams in question. The configuration map specifies for each of the streams in question the error management policy to be applied to the erroneous data received, the nature of the supplementary information or "private information" to be joined to any irreparable data transmitted to the client, and possibly information on the supplementary stream dedicated to the transfer of the erroneous data to the client. This configuration map is established by the client preferably from the description of the multimedia sequence as well as any supplementary information in particular on the error management services available on the PIC and on the state and nature of the networks (bandwidth reserved, rate or latency time). The PIC can subsequently receive, during the transfer of multimedia data, new configuration maps from the client, making it possible to dynamically adapt the processing operations carried out for the error management.

3) When the PIC receives from the network multimedia data relating to the sequence in question, in the form of packets of data, it applies the selected error detection methods in order to detect any errors.

4) The PIC selects the erroneous data for which one or more error correction mechanisms, combined or not, must be implemented using criteria and constraints defined in the configuration map sent by the client. For each of the erroneous data selected, the PIC applies the specified error correction mechanisms, according to the configuration map, using known techniques, for example of the ARQ, Hybrid ARQ or bit recombination type.

5) The PIC creates new packets for the erroneous data for which the selected error correction mechanisms have allowed only partial correction, and for the erroneous data that has not been selected for the error correction phase, also containing erroneous data on the supplementary information according to the criteria defined by the configuration map of the PIC for the error management.

6) The PIC transmits to the client the new packets generated in a new data stream, referred to as "extra stream", different from the streams initially defined in the description of the multimedia sequence in question, dedicated to the transmission of erroneous data, at best partially corrected, for all the data streams in the sequence and whose characteristics can be specified by the configuration previously transmitted by the client. The use of several extra streams for the transfer of the erroneous data, one for each stream in question for example, can be envisaged. The configuration map must then make provision for being able to describe the characteristics of each of these streams and in particular make it possible to specify which is the data that must be transferred by a given extra stream.

FIG. 1 presents schematically an example of the environment 100 for implementing the invention in which the standard client 105 and the proprietary client 110 receive multimedia streams from the server 115 over heterogeneous networks 125, 130 and 135, cable and wireless. Each client terminal may for example be a device like the one described with reference to FIG. 2 advantageously comprising a volatile storage memory (cache), a file server and an man-machine interface. The PIC 120 corresponds to the point of interconnection of the cable and wireless networks through which the exchanged data passes.

The data transferred from the server 115 to the clients 105 and 110 passes over a wireless network 135, sensitive to the errors generated in particular by any interference 140, before being relayed by the PIC 120 to the clients 105 and 110 on the cable network 130, less sensitive to errors.

The environment present in FIG. 1 is of course only one example of a system for implementing the invention. The invention can, for example, be applied also if the network 130 is a wireless network. The PIC (120) may for example be an access point in a Wi-Fi network connecting the wireless network to a cable network whilst connecting the wireless stations to one another (infrastructure mode).

Figure 2:
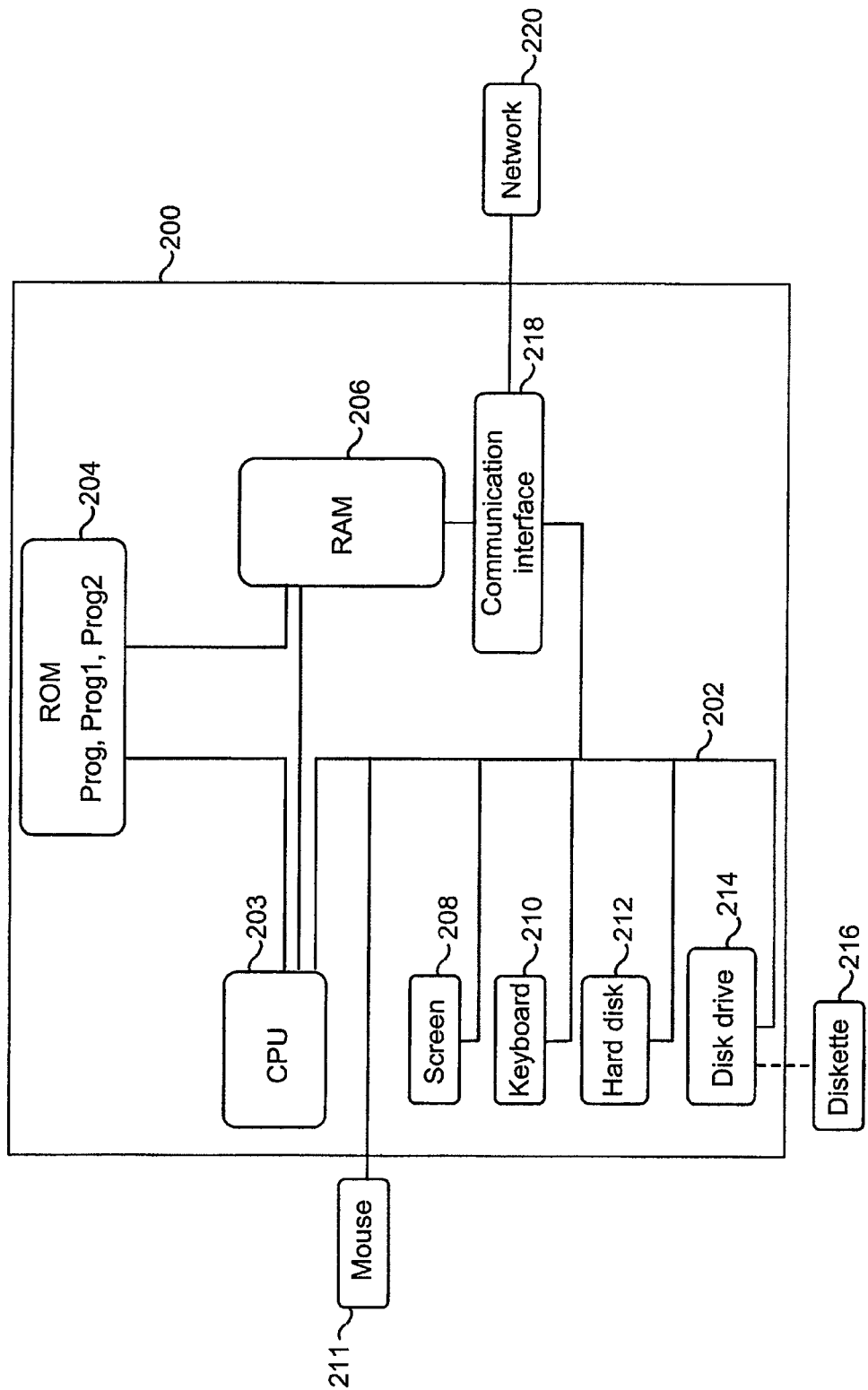
FIG. 2 shows an example of an apparatus for at least partially implementing the invention.

FIG. 2 depicts the structure of an apparatus adapted to implement part of the invention such as the PIC or the client device.

A client apparatus implementing the invention is for example a microcomputer, a workstation, a digital assistant, a portable telephone, a television receiver or a decoding box connected to a display device (set top box).

The apparatus 200 comprises a communication bus 202 to which there are connected:
- a central processing unit 203 (microprocessor);
- a read-only memory 204, able to contain the program "Prog", "Prog1" and "Prog2";
- a random access memory 206 (cache memory), containing registers adapted to record the variables and parameters created and modified during the execution of the aforementioned program; and
- a communication interface 218 connected to a distributed communication network 220, for example the Ethernet network, the interface being able to transmit and receive data. In the case of a PIC, the apparatus preferably comprises a second communication interface connected to a second network, for example a WiFi (or 802.11n) network.

Optionally, the apparatus 200 can also have:
- a screen 208 for displaying data and/or serving as a graphical interface with the user, who will be able to interact with the programs according to the invention by means of a keyboard 210 or any other means such as a pointing device, such as for example a mouse 211, an optical pen, a touch screen or a remote control;
- a hard disk 212 able to contain the aforementioned programs "Prog", "Prog1" and "Prog2" and data processed or to be processed according to the invention;
- a disk drive 214 adapted to receive a diskette 216 and to read or write thereon data processed or to be processed according to the invention; and
- a memory card reader (not shown) adapted to receive a memory card in the corresponding format and to read or write thereon data processed or to be processed according to the invention.

The communication bus affords communication and interoperability between the various elements included in the apparatus 200 or connected to it. The representation of the bus is not limiting and in particular the central unit is able to communicate instructions to any element of the apparatus 200 directly or by means of another element of the apparatus 200.

The executable code of each program enabling the programmable apparatus to implement the processes according to the invention can be stored, for example, on the hard disk 212 or in read-only memory 204.

According to a variant, the diskette 216 can contain data as well as the executable code of the aforementioned programs which, once read by the apparatus 200, will be stored on the hard disk 212.

In a second variant, the executable code of the programs can be received by means of the communication network 220, via the interface 218, in order to be stored in an identical fashion to that described above.

The diskettes can be replaced by any information medium such as for example a compact disk (CD-ROM) or a memory card. In general terms, the diskettes can be replaced by information storage means, able to be read by a computer or a microprocessor, integrated or not into the apparatus, possibly removable, and adapted to store one or more programs whose execution enables the method according to the invention to be implemented.

In more general terms, the program or programs can be loaded into one of the storage means of the apparatus 200 before being executed.

The central unit 203 will control and direct the execution of the instructions or portions of software code of the program or program according to the invention, instructions that are stored on the hard disk 212 or in the read-only memory 204 or in the other aforementioned storage elements. On powering up, the program or programs that are stored in a non-volatile memory, for example the hard disk 212 or the read-only memory 204, are transferred into the random access memory 206 (RAM), which will then contain the executable code of the program or programs according to the invention, as well as registers for storing the variables and parameters necessary for implementing the invention.

It should be noted that the communication apparatus comprising the device according to the invention can also be a programmed apparatus. This apparatus then contains the code of the computer program or programs, for example fixed in an application specific integrated circuit (ASIC).

Figure 3:
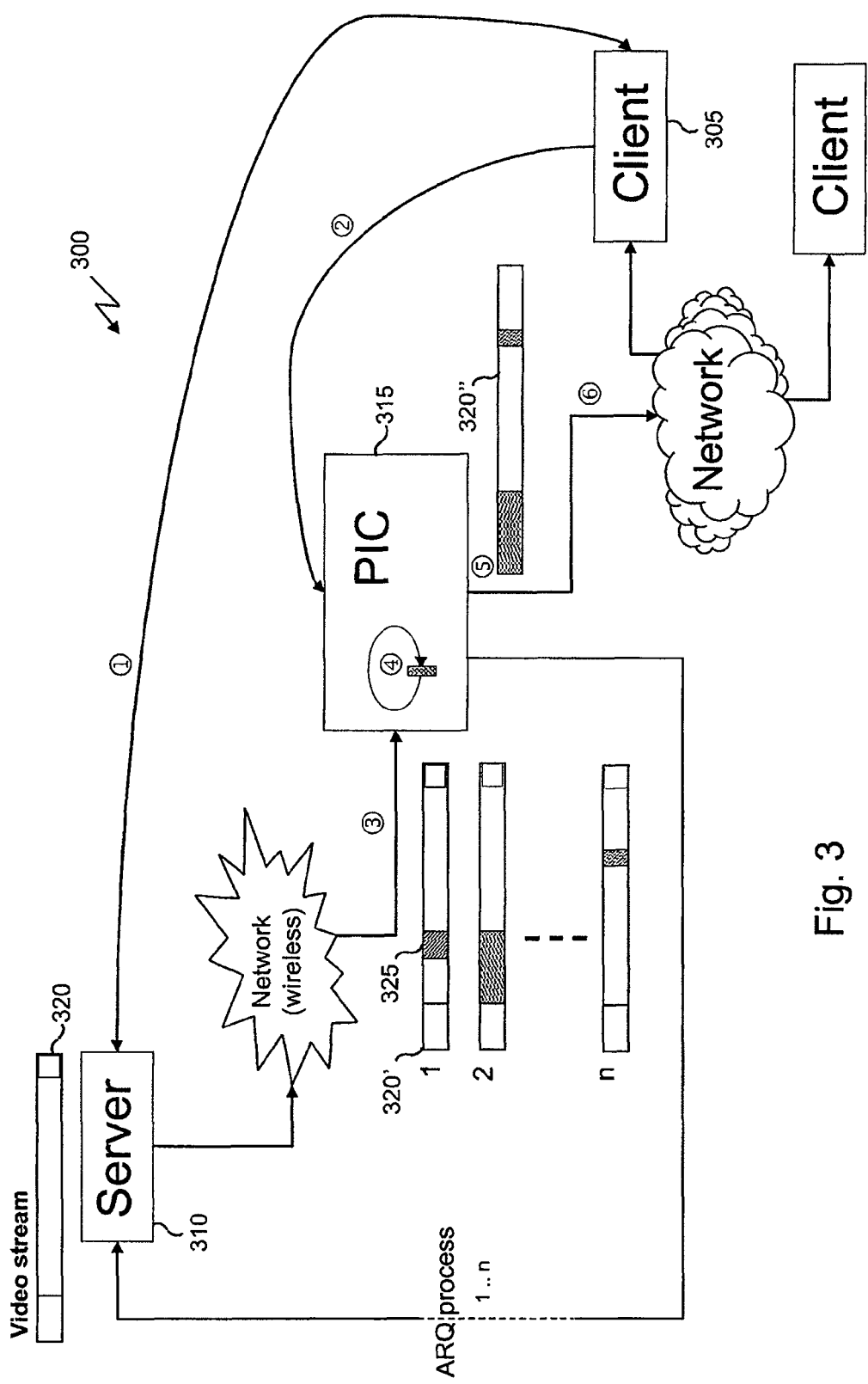
FIG. 3 illustrates certain steps of the algorithm according to the invention for managing the transmission errors of a network.

FIG. 3 illustrates the steps of the invention mentioned previously, in the environment 300 for implementing the invention.

According to a first phase denoted ①(corresponding to step 501 of FIG. 5), the client 305 and server 310 exchange the description of the multimedia sequence that the client 305 wishes to obtain, using protocols such as RTSP (Real Time Streaming Protocol) and SDP (Session Description Protocol). A sequence can contain several streams, in particular audio and video. The description and the RTSP exchanges for establishing the session enable the client 305 to know the identifiers, the ports and the encoding of each of the streams. One example of such an exchange is described with reference to FIG. 7a, in particular by the reference 700.

In a second phase denoted ②, the client 305 defines and transmits a configuration map for managing the errors at the point of interconnection 315 of the network, which will make the data packets of the multimedia streams of the sequence in question transit.

Figure 5:
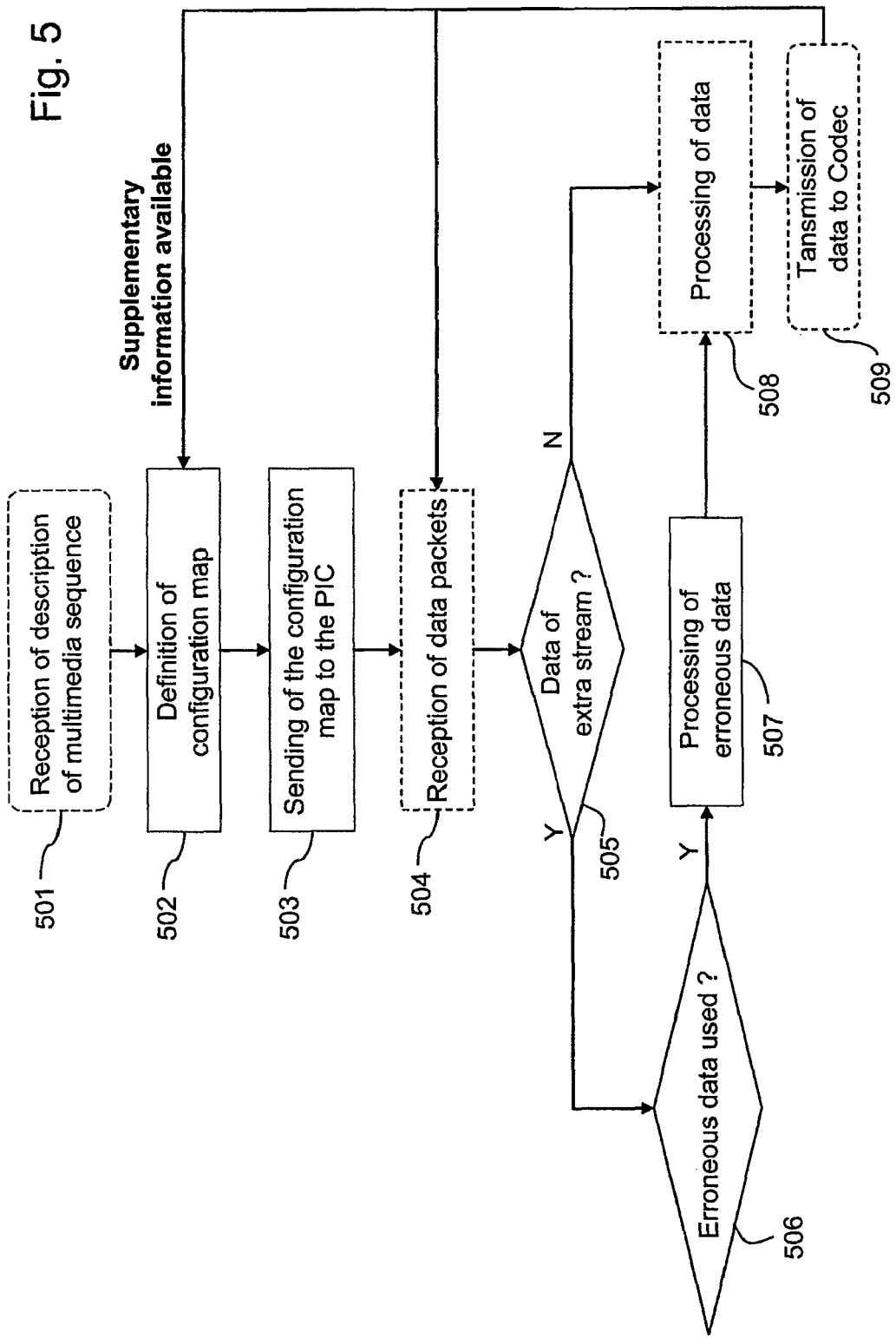
FIG. 5 depicts schematically an example of an algorithm used by the client.

One example of implementation of the steps of definition and transmission of the configuration map by the client is presented in FIG. 5, in particular by steps 502 and 503.

Figure 4:
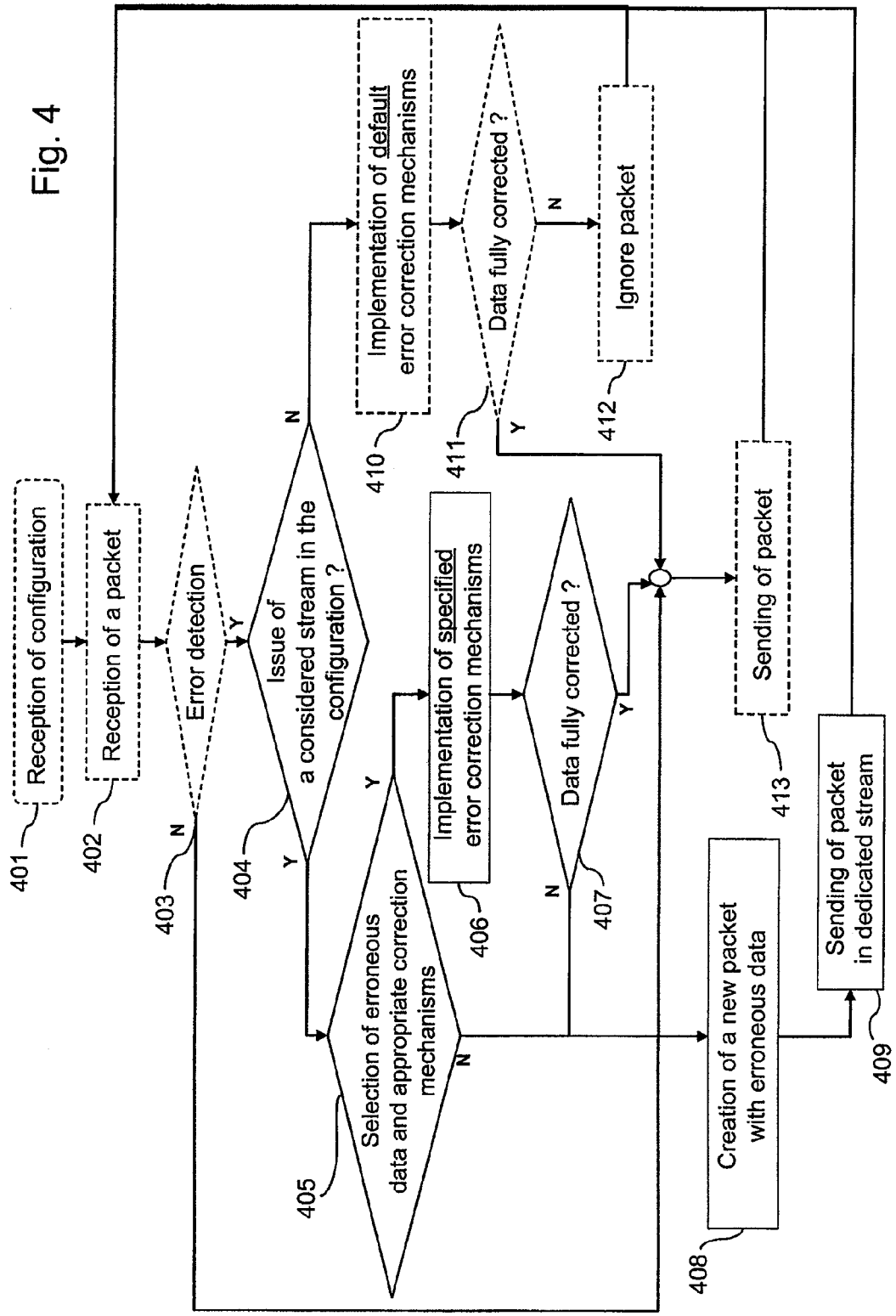
FIG. 4 depicts schematically an example of an algorithm used by the PIC.

In a third phase denoted ③, the PIC 315 receives the multimedia data packets relating to the sequence in question (corresponding to step 402 in FIG. 4) and detects any errors, using known error detection mechanisms (corresponding to step 403 of FIG. 4). For example, the PIC 315 receives the packet 320' corresponding to the packet 320 sent by the server 310, the packet 320' comprising the errors 325. The steps 402 and 403 of the algorithm of the PIC described with reference to FIG. 4 present an example of management of the data received.

According to a fourth phase denoted ④, the PIC 315 selects the packets of erroneous data for which one or more error correction mechanisms must be implemented, as well as the type of mechanism to be applied (for example ARQ or Hybrid ARQ). An example of implementation of this process is presented in FIG. 4, at steps 404 and 405. At the end of this selection, the PIC 315 implements the appropriate error correction mechanism or mechanisms (corresponding to step 406 in FIG. 4), in accordance with the information in the configuration map previously identified, for the packets selected. The packets not selected for implementation of the error correction mechanisms are also kept in order to be transmitted as they stand to the client 305 in the stream dedicated to the transfer of erroneous data in accordance with steps 408 and 409 described in FIG. 4.

Figure 7B:
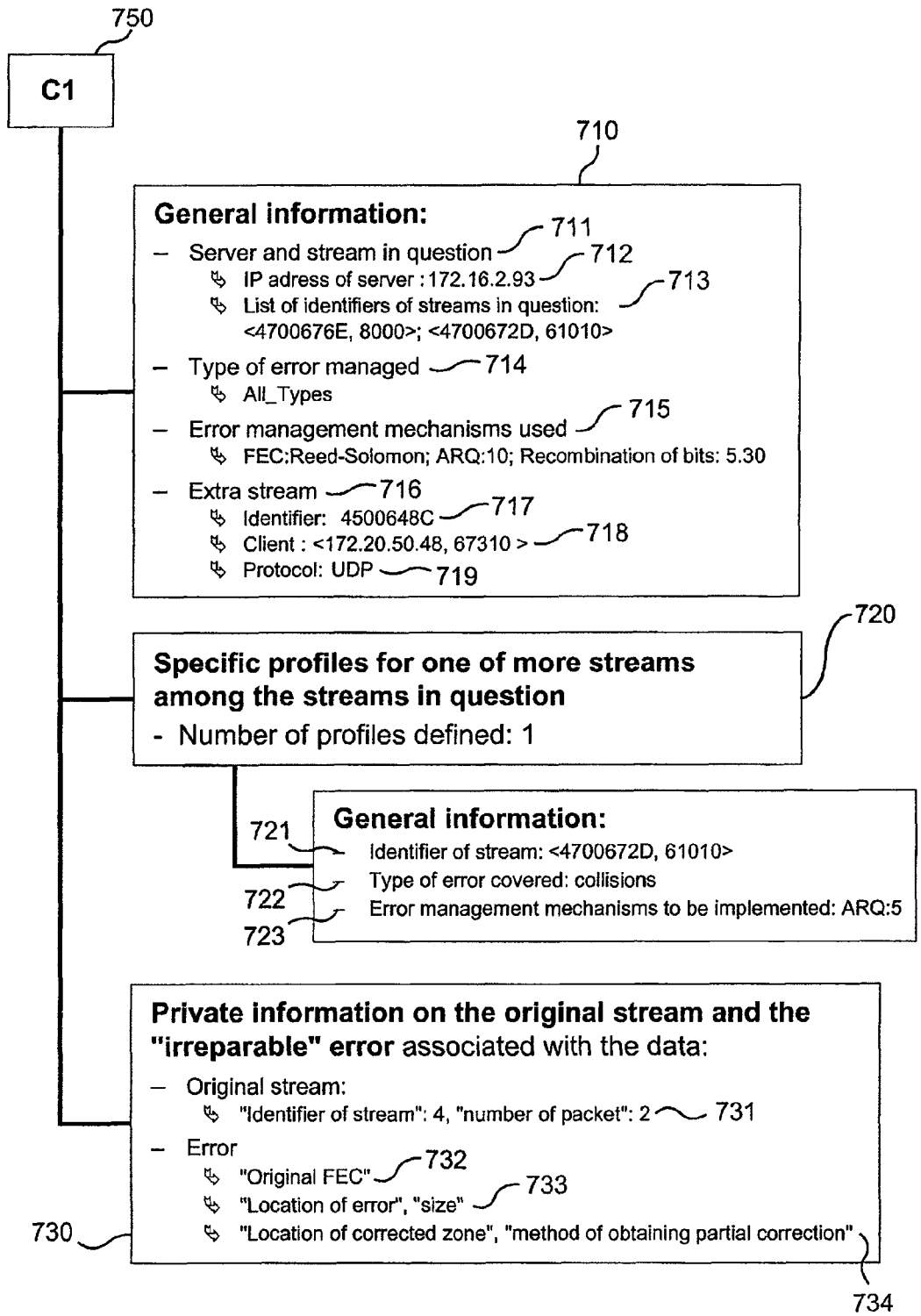

According to a fifth phase denoted ⑤, the PIC 315 creates new data packets (corresponding to step 408 in FIG. 4) for all erroneous data that it has not been possible to correct fully and those that have not been selected for implementing the error correction mechanisms, in which the private information is added, in accordance with the configuration map (see reference 730 in FIG. 7b). An example of this preparation is described with reference to FIG. 4, in particular at steps 408 and 409. For example, the PIC 315 creates the data packet 320'' from the data received in the packet 320', corresponding to the packet 320 sent by the server 310, where some of the errors detected 325 have been corrected.

Finally, in a sixth phase denoted ⑥, the PIC 315 transmits the created packets to the client 305 in a supplementary stream (extra stream) dedicated to the transfer of erroneous data (corresponding to step 409 in FIG. 4 for the PIC and to steps 504 to 509 in FIG. 5 for the client), independent of the original data streams and initialized according to the specifications of the configuration map (corresponding to step 716 in FIG. 7b).

FIG. 4 describes an example of an algorithm used by the PIC to manage the data that passes through it.

The steps identified in dotted rectangles or diamonds are steps implemented in the systems according to the prior art, the new steps being identified by rectangles or diamonds having continuous lines. This same principle is also used in FIG. 5.

Prior to any exchange of multimedia data between the client and server, the PIC receives from the client a configuration map (step 401) according to a proprietary protocol on TCP (Transmission Control Protocol, eventually of the SOAP type (Simple Object Access Protocol).

It should be noted that a PIC can manage several configuration maps, in particular one per client. A PIC can also store several configuration maps for one and the same client, who will then be able to simply specify dynamically the configuration map at a given moment amongst those already transmitted and managed or transmit a new configuration map. For reasons of clarity, the remainder of the description will consider only a single configuration map per proprietary client, the management of several configuration maps being obvious to a person skilled in the art.

The PIC preferably receives the data encapsulated in RTP (Real-time Transport Protocol) packets on UDP (User Datagram Protocol), the headers of which contain various items of information on the identification of the stream and of the packet, in particular the IP (Internet Protocol) addresses and the UDP ports of the client and server for the UDP header, the identifier of the stream (Synchronization Source identifier) and the sequence number of the packet for the RTP header.

For each of the packets received (step 402), the PIC seeks to detect the possible presence of an error (step 403) using known selected detection mechanisms allowing in particular the use of FECs of the Reed-Solomon type, present in the packets transmitted, by a quantized decision decoder capable of identifying the estimated location of the error by definition of a confidence index on the data bits. Such mechanisms are described in particular in the article entitled "*Algebraic soft-decision decoding of Reed-Solomon codes*" by R. Koetter and A. Vardy (IEE Trans. Inf. Theory—Volume 49; no 11, pp. 2809-2825, November 2003), in the article entitled "*Performance enhancements for algebraic soft-decision decoding of Reed-Solomon codes*" by M. El-Khamy, R. J. McEliece and J. Harel (Proc. DIMACS, AMS-DIMACS—Volume on Algebraic Coding Theory and Information Theory) and in the article entitled "*Iterative algebraic soft-decision decoding of Reed-Solomon codes*" by M. El-Khamy and R. J. McEliece (Proc. Int. Symp. Information Theory and Its Applications, pp. 1456-1461, Parma, Italy—March 2004). Other error detection and correction mechanisms such as CRC (Cyclic Redundancy Check), Turbo codes, LDPC (Low Density Parity Check) or "repeat-accumulate" can also be used.

When no error is detected, the PIC retransmits the packet normally in its original stream to the final client (step 413).

When an error is detected, the PIC can implement a mechanism of identification of the error, possibly based on the avoidance mechanism of the MAC (Media Access Control) layer of the DCF (Distributed Coordination Function), in order to determine the origin of this error (collision or loss). This optional phase may be based on other mechanisms.

The processing operations then applied to the erroneous data item are related to various selection criteria defined in the configuration map, relating to the identification of the original stream of the data, the nature of the error and possibly the type of data in itself, as described with reference to FIG. 6.

The PIC first of all determines whether the packet meets the selection criteria (step 404) defined in the configuration map according to the information connected by the syntactic analysis (parsing) of the RTP and UDP headers of the packet, in particular the address of the server, the UDP port of the addressee and the SSRC identifier, on the identity of the stream. For this purpose, the PIC compares this information with the elements <ssrc_i, port_i> in the list of streams in question of the configuration map (reference 611 in FIG. 6).

Figure 6:
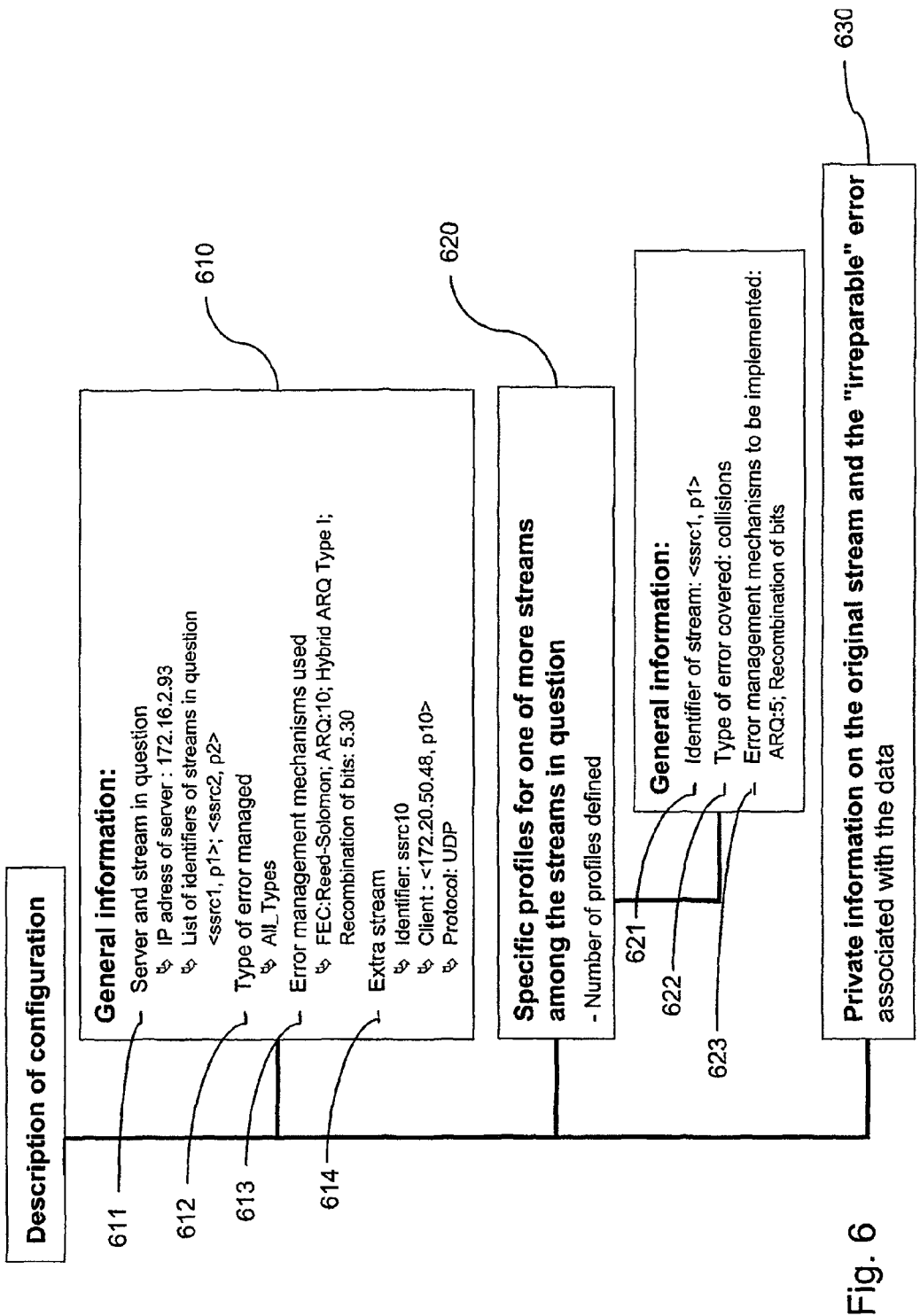
FIG. 6 illustrates an example of a configuration map.

It should be noted that, as long as no data item has been exchanged with the client, the latter may be ignorant of the SSRC of the stream in question and therefore may not be in position to fully give information on the identifying pair of the configuration map for this stream (reference 611 in FIG. 6). The identification of the stream is then based on the information supplied by the UDP header: the address of the server that transmitted this packet and the UDP port of the addressee. In this context, the identification of the packets received does however remain imprecise since the information available does not make it possible to differentiate two streams transmitted by the server to the same UDP port. It is therefore preferable to identify a stream from its SSRC identifier when the information is available, which should be possible provided that the configuration is established after the RTSP session has been initialized by the sending of "SETUP" messages (corresponding to step 706 in FIG. 7a) or updated by the client after he has been informed of the SSRCs of the stream by the reception of RTCP messages of SR (Sender Report) type for example.

If the stream does not appear in this list (for example the reference 707 in FIG. 7a illustrating an SDP comprises a French audio stream 707-2, audio.fr, absent from the list of streams considered in the configuration map 713 in FIG. 7b), the data item does not meet the essential selection criteria defined by the configuration map, and the PIC then applies the default error processor, for example of the ARQ type (step 410), defined outside the context of this invention. At the end of this processing, a test is performed in order to determine whether the data of the packet is entirely corrected (step 411). Any data packet not entirely corrected is ignored (step 412)

whilst the entirely corrected data packets will be retransmitted corrected to the client in the original stream (step 413).

At the end of step 404 the PIC selects the erroneous data issuing from the streams in question according to the configuration map and then determines the error correction mechanism or mechanisms to be implemented (step 405), from the following information:

- the origin of the error collected during the previous step, which the PIC compares with the list of error types managed, possibly specified in the configuration map (reference 612 in FIG. 6). If the type of error detected is not considered, the erroneous data does not correspond to the selection criteria and no error correction mechanism has to be implemented to attempt to correct it.
- the identity of the original stream that the PIC utilizes to verify the possible existence in the configuration map of a profile specific to this stream (reference 620 in FIG. 6), identified by the identifying pair <ssrc_i, port_i>.
    - if such a profile exists and defines specific error correction mechanisms (reference 623 in FIG. 6, heading "Error management mechanisms to be implemented"), possibly restrictive compared with the mechanisms defined in the general information (reference 613 in FIG. 6), it is these mechanisms that must be implemented in their order of appearance in the list.
    - if on the other hand no profile is defined for this stream, it is the mechanisms defined in the general information (reference 613 in FIG. 6) that must be applied in their order of appearance in this list.

This information as well as other supplementary information, in particular on the type of data contained (for example the type of image I, P or B for a video, the nature of the layer (base or enhanced) and the importance of the NAL (Network Abstraction Layer): information available directly in the packets in particular in the NRI bits of the header of the NALU in the case of H264 or SVC video), can be exploited at various levels of the configuration map so as to specify the selection criteria and/or the mechanisms to be implemented according to the specifications of the configuration. The nature of the errors considered can be specified at the profile of a stream (reference 722 in FIG. 7b), in order to consider, for example, only the errors due to collisions.

If the data item meets the selection criteria defined by the configuration map, the PIC implements the appropriate error correction mechanism or mechanisms (step 406), in accordance with the indications in the configuration map.

At the end of steps 405 and 406, a test is performed in order to determine whether or not the data item in question has been entirely corrected (step 407), in particular using any FECs present in the packets received for this data item If the data item is entirely corrected during the process, it is then retransmitted normally to the client in its original stream (step 413).

If on the other hand the data item is at best partially corrected during the process or has not been selected for the implementation of error correction mechanisms, a packet intended for the client is created (step 408) for this data item.

For each packet of erroneous data created private information is associated with the data, in accordance with the configuration map. This private information can for example comprise the identifier of the stream from which the data item comes (reference 811 in FIG. 8), its relative position in this stream (reference 812 in FIG. 8) and the original FEC if it was present in the packet received (reference 831 in FIG. 8). The private information is preferably protected by a FEC code of the Reed-Solomon type.

For this purpose the PIC determines, for each erroneous data item considered, the private information to be collected for constructing the packet to be transmitted from the configuration map (references 630 and 730 in FIGS. 6 and 7b).

The PIC then contains the private information required, from the information collected during the previous steps,

- the identification of the erroneous data by SSRC identifier of its original stream and its sequence number in this stream (references 811 and 812 in FIG. 8);
- the original information from the point of view of error management, that is to say the original FEC (reference 831 in FIG. 8);
- the location of the irreparable error (reference 822 in FIG. 8), collected by the quantized decision decoder (location of the erroneous zone and its extent by an indication of the areas of less confidence);
- the location of the partial correction made (references 823 and 824 in FIG. 8), if there has been one (location of the corrected zone and identification of the mechanisms by order of application that made it possible to obtain this correction).

The PIC then creates, in accordance with the indications in the configuration map (reference 630 in FIG. 6), a new RTP packet from this supplementary information, the erroneous data partially corrected as well as possible and a new FEC of the Reed-Solomon type calculated on this data and this information.

The protocol used for the extra stream may be different from that used for the data stream. The TCP and UDP protocols can in particular be used for this data stream. Likewise other error managements techniques can be applied to this new packet, the useful data of which, referred to as payload, can be entirely or partially considered (the data alone, the information alone or a data segment).

Using the same protocol as the original stream (RTP on UDP), a new source can be defined in the session for the extra stream, making it possible to distinguish it from the initial streams.

The PIC next transmits the new packets in a supplementary dedicated stream, the extra stream dedicated to the transfer of the erroneous data, independent of the original data streams (step 409). For this purpose, if none of the irreparable data has yet been transferred to the client or if the indications in the configuration map for the extra stream (reference 614 in FIG. 6) have been modified by the last updating of the configuration map, the PIC first of all initializes this new stream in accordance with the instructions in the configuration map, closes the previous extra stream if one existed, and then transmits the new packets previously created for transfer of the erroneous data to the client.

In a context where the protocol use for the extra stream is identical to that of the initial streams (RTP on UDP), the initialization of the stream can consist of creating the new source and informing the receivers that a new source is participating in the session by sending a packet of the RTCP SR type to the client.

At the end of this process, the fully corrected packets are therefore transmitted to the final client (step 413) in the original data stream and the new packets generated at the end of the error correction process for the erroneous data at best partially corrected are transmitted in the data stream dedicated to the transfer of erroneous data (step 409).

Many variants of this algorithm can be used.

Thus the erroneous packets issuing from streams for which no error management policy has been defined, although considered at other levels in the configuration map, can be ignored instead of being retransmitted to the client in the stream dedicated to the transfer of erroneous data. Likewise, only the packets for which at least one partial correction has been obtained can be retransmitted to the client.

Moreover, in a context where the PIC has means necessary for establishing statistics, it may be desirable for it to establish the statistics on the erroneous data, the corrections made and the results obtained in order to transmit them to the client, in specific packets of the extra stream, thus enabling it to have available this information for updating the configuration map of the PIC for error management.

FIG. 5 illustrates an example of an algorithm used by a client for managing the data transferred from the server via the network interconnection points.

Before any transfer of multimedia data, the client receives from the server the description of the multimedia sequence that he wishes to transfer (step 501), using protocols of the SDP and RTSP type as described with reference to FIG. 7a. The configuration is produced once the session has been initialized by the sending of "SETUP" messages for the required streams of the multimedia sequence, so that the client has available SSRC identifiers for these streams (references 708 and 709 in FIG. 7a).

The client then produces a configuration map (step 502) for the PIC through which the data will transit during their transfer to the client. The configuration map produced may cover all or only some of the streams described in the sequence description (see for example the references 707 and 713 in FIGS. 7a and 7b, where three streams are defined in the SDP description but only two are taken into account in the configuration map).

The client preferably produces the configuration map from the following data:
- the description of the multimedia sequence that he wishes to transfer and RTSP exchanges for the creation of the session, specifying the identifiers and characteristics of the streams of the multimedia sequence,
- information on the error management services available on the PIC, defined on the client by configuration or discovered by service discovery mechanisms, such as UPnP (Universal Plug and Play) and SSDP (Simple Service Discovery Protocol),
- complementary information on the state of the networks passed over, for example the reserved bandwidth, the transmission rate, the latency time and the error rates observed on the network for these streams, supplied by a static configuration or by data calculated on the messages previously exchanged,
- information known from the client, for example the type of application of the client and its acceptable latency. In the case of a conference video in particular, the latency is very small and therefore mechanisms of the ARQ type must be excluded. On the other hand, for an application recording the stream received, the quality must be maximum even if the latency is high, and the number of retransmissions can then be increased.

The configuration map obtained is then transmitted to the PIC (step 503) using a proprietary protocol, for example a SOAP message on TCP.

When the multimedia exchanges are initiated, the client determines, for each data packet received (step 504), its provenance (step 505), in particular according to the port on which it was received, the SSRC identifier of the stream and possibly the protocol used (for example if the protocol used for the extra stream differs from that of the initial streams, see also FIG. 7a). In a context where the multimedia data is transmitted in its original stream via RTP packets on UDP, the client makes a precise identification of the streams by performing a syntactic analysis (parsing) of the RTP header, in order to extract therefrom the SSRC identifier of the stream.

If the packet received comes from the original multimedia streams, it is then sent to the data management modules (step 508) before being transmitted to the decoders (step 509). In the contrary case, the packet contains erroneous data that requires preparation before being able to be transmitted to the decoders.

Figure 8:
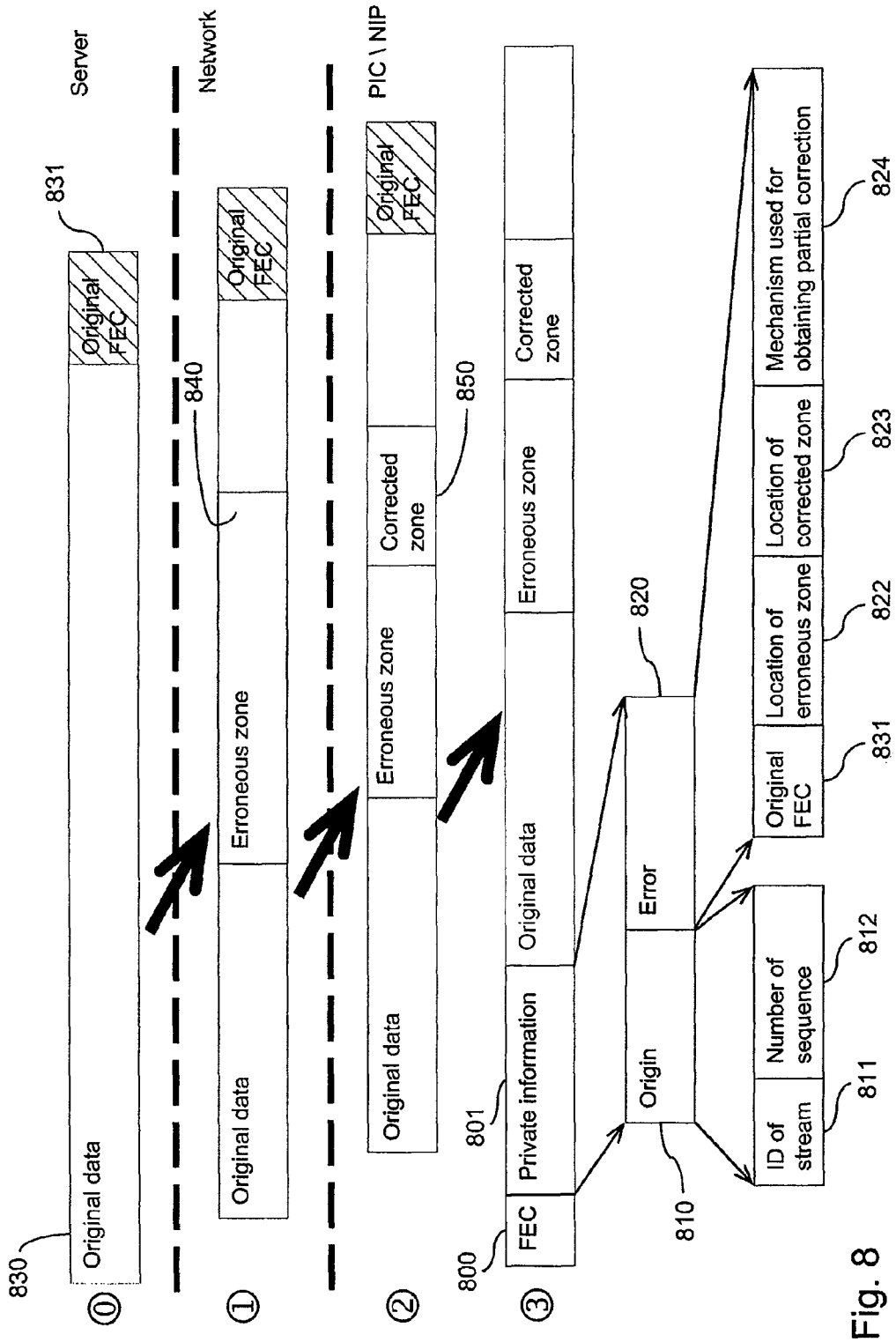
FIG. 8 shows the evolution of data processed according to the invention.

If the client has means necessary for processing it, in particular local resources available and the necessary configuration, the packet is transmitted to a proprietary module (step 507) capable of exploiting the header and the data, in particular in order to verify the integrity of the packet of the FEC supplied (reference 800 in FIG. 8). It can also identify the original stream (reference 811 in FIG. 8) and determine whether it is pertinent to transmit this erroneous data to the appropriate decoder, checking for example that it is not already saturated or too simple to compensate for this error. Before transmitting the erroneous data to the following data processing modules, the proprietary module is also responsible for preparing the data, that is to say isolating the private information that precedes it in the payload of the packet, and the supplementary information that the packet contains (step 508), intended for the decoders according to their characteristics (step 509), so that they can decide which error concealment processing operations are the most appropriate for mitigating this error. Another example of data processing can consist of the use of a second FEC level, between packets, using, to correct certain errors, several packets received, supplementary FECs sent by the server and partially corrected data.

If the client does not have means necessary for processing the packets containing erroneous data, these packets are ignored.

At the end of step 509 the client is once again available to process new data or define a new configuration map for the PIC.

Other algorithms can be used in particular for including a regular update of the configuration of the PIC according to their results, that is to say for example the quality of the error correction processes, the characteristics of the network and the change in rate.

FIG. 6 represents an example of a configuration map structure. This structure makes it possible to define all the information necessary to the configuration of a PIC for error management.

The configuration map preferably has a hierarchical representation that can be written, for example, in XML format (Extensible Markup Language).

A first part 610 contains the general information that comprises in particular:
- the identification 611 of the streams considered in this configuration map making it possible to select, for any error management processing operations, only the data of these streams (steps ④ and 404 in FIGS. 3 and 4), from information on:
  - the server initializing their transfer to the client (IP address),
  - the multimedia streams themselves, that is to say a list of pairs of identifiers <ssrc_i, port_i> preferably separated by semicolons, where the pair of identifiers is composed of an SSRC present in the headers of the RTP packets in order to uniquely identify the stream and a UDP port number present in the headers of the UDP packet, by means of which the client receives the data in this stream. The SSRC may be absent from this pair of identifiers, and the identification of the stream will then be based on the destination port and the IP address of the server. Two streams transmitted by the same server over the same UDP port of the same client may therefore, in the absence of SSRC, be considered to be a single stream. It is preferable for the SSRC of a stream to be present in the identifying pair. If the original stream of an erroneous data item received by the PIC does not appear in this list, although sent by the server designated in the configuration map (for example the French audio stream 707-2 in FIG. 7*a*, audio.fr, is absent from the list 713 in the FIG. 7*b*), the data item cannot be selected for implementing error correction mechanisms in the context of this invention.

the types of error 612 taken care of, designated by acronyms in a list where each item is separate by a semicolon. If this list 612 contains the keyword "All_Types", or an equivalent keyword, or if it is absent from the configuration map, this means that all types of error are covered by the mechanism unless otherwise indicated at the profiles specific to the streams. On the contrary case, the PIC must, in order to select the data for which the error correction mechanisms can be implemented (step 405 in FIG. 4), determine whether the acronym used for the type of error detected appears in the list. If a data item has been received erroneous by the PIC because of interference on the wireless network, and the configuration covers only the errors due to congestion, no error correction mechanism is applied and the data item is transmitted as it stands to the client via the stream dedicated to erroneous data (steps 408 and 409 in FIG. 4).

the error correction mechanisms 613 to be implemented by default in order to apply this configuration. This list specifies, according to a private format based on the use of acronyms, one, several or a combination of mechanisms as well as any operating parameters (for example the number of attempts before abandonment for the ARQ) that must be applied, in their order of appearance in the list, to the erroneous data selected. The acronyms representing the mechanisms to be implemented are preferably separated by semicolons. The parameters of these mechanisms may be specified in a predefined order, preceded by a colon (:) and separated by commas. For example, the expression "Recombination of bits: 5, 30" means that at most 5 attempts of the ARQ type must be made before attempting a recombination of bits on all the data received for this packet and that only a combination affording at least 30% correction with respect to the original error can be kept. For a erroneous data item issuing from a stream considered by the configuration map and for which no specific profile is defined in the configuration map, if the error originates in a reason covered by the configuration map, the PIC applies the error correction mechanisms as specified in this list in their order of appearance (reference 715 in FIG. 7*b*) until the data item has been entirely corrected or all the mechanisms and combinations defined have been tried.

the stream for retransmission of the erroneous data 614, or extra stream, in order to be able to initialize it for the transfer of the erroneous data to the client (step 409 in FIG. 4). The information is supplied in a private format based on the use of acronyms, and can thus be defined in any order, or even in certain cases be omitted (for example the "identifier of the stream" for a protocol of the UDP type). The heading "identifier of the stream" makes it possible to specify the SSRC identifier of the stream, defined by the application. The heading "client" specifies the details of the client (his IP address and his port) where the PIC will have to transmit the packets of erroneous data. Finally, the heading "protocol" specifies the network protocol to be, used for transmitting the erroneous data.

Other information can be specified at this level, in particular the protection means to be applied (of the FEC, CRC, turbo codes or repeat-accumulate type) to the private information and/or the erroneous data for transfer thereof in the extra stream as well as its possible scope (all the erroneous data, the corrected zone alone or the private information alone). A policy of multiplexing of the data packets can also be specified, making it possible to limit the overhead generated by the private information in particular if this policy makes it possible to group together several packets in one and the same stream that have arrived erroneous in a given time space.

This information enables the PIC to identify the streams for which it must implement a specific error management processing and to initialize the extra stream for the transfer of erroneous data that it has not been possible to correct.

It should be noted that, in this example, a single extra stream can be created. It is possible to extend the system in order to support several extra streams, for example one for each data stream in question.

A second part 620 is devoted to the description of error management profiles. Each profile defines, for one or more streams among those identified in the general information at 611, the error management policy to be applied to the erroneous packets that issue therefrom. According to this example, only one profile per stream can be defined.

These profiles are organized as follows in the configuration map:

the number of profiles defined is specified in order to facilitate the searches for selecting the data and to determine the error correction mechanisms to be applied (step 405 in FIG. 4);

for each profile, general information is defined making it possible, to identify the streams to which this profile relates, among those identified in the general information of the description, according to a list of pairs of identifiers 621 organized in the same format as the list of streams considered at 611;

to identify the types of error considered from the origin according to a list of error types 622 organized in the same format as the list of errors supported in general terms at 612;

to define the mechanisms and any operating characteristics thereof to be implemented for the designated streams, according to a list of mechanisms 623 organized in the format defined for the list of mechanisms to be implemented at 613. This list may be restrictive and have recourse to fewer mechanisms than the one previously defined in the general information, simply redefine the specific parameters of the mechanisms used or specify an order of implementation or different combinations. It may in particular be void, thus specifying that, for the erroneous data issuing from the streams designated at 621, no error correction processing must be applied. The data are retransmitted as they stand with the information collected on the error in the extra stream to the client (step 408 in FIG. 4).

The mechanisms or combinations of mechanisms defined for a given profile are executed instead of the mechanisms defined in the general information 613 for the processing of erroneous data meeting the selection criteria defined by the elements 611, 612, 621 and 622.

The lists specifying the types of error covered or the error correction mechanisms to be applied may be absent from the profile, so that, if one of them is omitted from the profile, the other must be specified.

These profiles can also be specified by one or more subprofiles defining the specific error management policies for defined types of data packets issuing from streams considered in the parent profile. The selection criteria can in particular take into account the nature of the pack and/or its priority in order to specify the mechanisms to be implemented in certain particular cases. For video, this makes it possible in particular to differentiate the processing applied to the I images from that applied to P or B images, or the levels of importance of the NALUs (Network Adaptation Level Units). It is for example possible to protect to a maximum extent the most important data (I images or the most important NALUs) and to abandon the least important.

This second part makes it possible to define various error management profiles for all or some of the streams considered in the configuration.

A third part 630 makes it possible to define the nature of the information that must be transmitted as supplementary private information associated with the erroneous data, which it has not been possible to fully correct during the process (steps 405 to 407 in FIG. 4) in the packets of the extra stream. The information required may consider various aspects of the process and data:
- the identity of the original stream and of the packet (references 731, 810, 811 and 812 in FIGS. 7b and 8).
- information concerning the error:
  - the detection means (references 732 and 831 in FIGS. 7b and 8) used by the PIC during the process (step 403 in FIG. 4);
  - the location and size of the error, as detected on reception of the packet by the PIC (references 733 and 822 in FIGS. 7b and 8);
  - the location and size of the partial correction (reference 823 in FIG. 8) if it has been possible to obtain a partial correction and the means used for obtaining this result (references 734 and 824 in FIGS. 7b and 8).

Acronyms are preferably used for designating the information to be collected, including "identifier of the stream" for designating the SSRC identifier of the original stream of the data in question or "Original FEC" for the value of the FEC possibly present in the original packet (reference 730 in FIG. 7b).

The sizes (in number of bytes) of each of the fields constituting the private information of the new packet are specified, when they are fixed and known, for each of the items of information required preferably according to a proprietary format (reference 730 in FIG. 7b), identical to the one used for the specific parameters of the error correction mechanisms 613.

This configuration map structure naturally constitutes only one example. Other selective and determining items of information, in particular those collected during the selection steps, possibly concerning the original of the error (for example interference and congestion), its nature or its extent, the nature of the original stream (for example the type of multimedia data and the base or enhanced layer) or of the erroneous data item (I, B or P Image), can be considered for defining profiles and subprofiles of the configuration map.

In addition the selection criteria can be organized differently and can make it possible for example to define the nature of the private information in the profiles or for each stream in question.

FIG. 7, comprising FIGS. 7a and 7b, presents a sequence of message exchanges between the client and the server for obtaining the description of the multimedia sequence required to the SDP format (FIG. 7a), as well as an example of instantiation of the configuration map presented in FIG. 6 for this multimedia sequence (FIG. 7b).

The client solicits the server in an RTSP session, prior to any exchange of multimedia data, in order to obtain the description of the multimedia sequence that he wishes to obtain (reference ① in FIG. 3) and to establish a session on the desired stream. These exchanges are shown at 700.

The client sends a first request "DESCRIBE" (step 701) to the server in order to obtain the description of the sequence to the SDP format. The response of the server (step 702) contains the description of the multimedia sequence 707 to the SDP format.

In this example, the multimedia sequence consists of three streams, one video stream and two audio streams. The information specific to each of the media specify certain of their essential characteristics. Among these, the UDP port reserved for this stream at the client constitutes advantageous information for identifying the stream in the absence of an identifier of the SSRC type.

When the description of the sequence is taken into account, the client sends a request "SETUP" (step 703) for negotiating the allocation of the resources necessary to the English audio stream (audio.en) and to initialize the session. The response of the server (step 704), in addition to repeating and validating the information on the port and protocol used for this stream, specifies its SSRC identifier 708, used subsequently during data exchanged by RTP.

The client continues the initialization of the session with a new request "SETUP" (step 705) for the video stream of the sequence previously described. The response of the server (step 706) also specifies the transport information and the SSRC identifier 709 relating to this stream.

The SSRC identifier fulfilling an important role for identifying the erroneous data received and the selective implementation of the appropriate error correction mechanisms (steps 404 and 405 in FIG. 4 and references 611 and 621 in FIG. 6), it is advantageous to instantiate the configuration map according to the model (template) presented in FIG. 6 when the RTSP session is initialized and the SSRC identifiers are known. In the absence of the SSRC identifiers, the identification of the streams will be based on the use of the UDP ports reserved on the client for these streams.

An instantiation "C1" of the configuration map template presented in FIG. 6 for the multimedia session described at 707 is presented at 750.

A first part 710 concerning the general information is composed of the following information:
- the identification of the streams in question in this configuration 711 (reference 611 in FIG. 6) from the following information:
  - the IP address of the stream server 712 "172.16.2.93" (this information is specified in the SDP description 707, reference 707-1);
  - the list of identifiers of the streams in question 713, amongst those of the multimedia sequence presented in 707. Only two pairs of identifiers appear in this list, each specifies the SSRC of the stream in question and the UDP port reserved on the client for these streams (these elements are extracted from the responses corresponding to steps 704 and 706) for facilitating the identification of this data by the PIC. The French audio stream 707-2 (audio.fr) described in the SDP description 707 is therefore not considered in the configuration map. If the client decides subsequently also to initialize this stream in the RTSP session, the erroneous data of this stream received by the PIC will not be selected (step 404 in FIG. 4) for implementing the correction mechanisms described here (715 or 723), unless the configuration is then updated suitably;

the types of error dealt with 714. The list contains the keyword "All_Types". All the types of error are therefore covered by the process (reference 612 in FIG. 6), unless otherwise specified by one or more profiles (720 to 723);

the error correction mechanisms 715 to be implemented by default, in order to apply this configuration. The list makes reference to three different correction modes:

use of the FECs of the Reed-Solomon type present in the data received;

implementation of a mechanism of the ARQ type for which no more than 10 attempts must be envisaged before abandoning if the data item has not been able to be fully corrected by virtue of the FEC mechanism; and implementation of an error correction mechanism of static type based on bit recombination.

If the implementation of these mechanisms as specified above does not allow entire correction of the data in question, the best partial correction obtained by the application of this last mechanism, as well as the information relating to the estimated location of the erroneous and corrected zones obtained during this error correction phase, are kept in order to be transmitted with the data, at best partially corrected, to the client in the extra stream (references 820 and 830 in FIG. 8);

the stream for retransmission of the erroneous data or extra stream 716 in order to be able to initialize it for the transfer of the erroneous data to the client (step 409 in FIG. 4). The heading "identifier of the stream" specifies the SSRC identifier 717 of the stream defined by the application. The heading "client" specifies the network details 718 of the client, his IP address and his port, where the PIC will have to transmit the packets of erroneous data. The heading "protocol" for its part specifies the network protocol 719 (UDP) to be used for transmitting the erroneous data.

At this level of the configuration map the information supplied makes it possible to select the erroneous received data from the identity of the server that transmitted them and their original stream (step 405 in FIG. 4) and to initialize the extra stream for the transfer of the erroneous data at best partially corrected.

The rest of the configuration must be run through in order to determine whether there exist one or more profiles specific to the streams in question, appropriate error correction mechanisms and private information to be collected for the transfer of the data into the extra stream.

The second part 720 of the configuration map defines a profile. The information specific to this profile is broken down as follows:

a means 721 of identifying the stream or streams in question for this profile. The list of identifiers contains only the pair of identifiers of the video stream <4700672D, 61010>. The profile therefore concerns only the video stream described at 707, 708 and 709 in the multimedia sequence in question;

a list 722 specifying the types of error covered. Here only the errors due to collisions are considered for this video stream. When this list is absent from the profile, all the errors covered by default 714 are also absent at the profile;

a list 723 specifying the error mechanism to be applied. This restrictive list is based on the use of a single mechanism of the ARQ type, for which only five tests will have to be performed before abandonment in the event of failure. When this list is absent from the profile, the mechanisms defined by default 715 must be implemented for the data in this stream.

Naturally, if the list identifying the errors covered by a profile is absent from it, the one specifying the error correction mechanisms to be implemented for this profile cannot be absent and vice versa.

At this level of the configuration and having regard to the scope of the profile defined (reference 721), this profile relates only to the video stream, and no specific selection criterion is therefore defined for the data of the English audio stream considered in this configuration. The data issuing from this stream, received erroneous by the PIC, will therefore be subjected to the error correction mechanisms defined by default at 715 until a total correction is obtained or after having executed all the mechanisms required.

With regard to the video stream, the data that was damaged on the network because of collisions will be subjected solely to the error correction mechanism specified by the profile (references 722 and 723) whilst the other data will be subjected, like the data of the English audio stream, to the correction mechanisms defined by default at 715 until a total correction is obtained or after having executed all the mechanisms required.

The third part 730 of this configuration map defines the nature of the information that must be supplied with the erroneous data in the packets of the stream dedicated to the transfer of erroneous data.

Concerning the origin 731 of the data, the configuration map requires that the identifier of the stream from which the erroneous data to be transferred came, as well as its sequence number in this stream, preferably be specified in this order, respectively in 4 and 2 bytes.

Concerning the error, various aspects are considered. These aspects concern first of all the origin 732 of the error (the FEC, if present, must preferably be specified). These aspects also concern the location 733 of the error. It is for this reason advantageous to specify its position in the original data and its extent in number of damaged bytes. Finally, these aspects concern any partial correction 734 of an error that may be obtained by applying the corresponding mechanisms (step 406 in FIG. 4). Its position in the original data and the mechanisms that made it possible to obtain this correction are preferably described in the format used in the configuration map (reference 715).

This instantiation is only one example given by way of illustration. The configuration map can be supplemented by network parameters in order to best adapt the processing operations applied to the erroneous data to the conditions of the network.

FIG. 8 illustrates the change in data, according to the invention, passing via a PIC, which has been damaged during its transfer from the server to the client via heterogeneous networks.

The state ⓪ corresponds to the state of the multimedia data 830 on the server before it is transmitted to the client via an unreliable network. This data is protected by a FEC 831, for example of the Reed-Solomon type, able to be used by the PIC for detection and error correction (steps 403 and 406 of FIG. 4).

The state ① represents the same data, received by the PIC after having passed over an unreliable network. This data has been partially damaged on the zone 840 during this transfer to their destination.

The state ② corresponds to the state of the data after application of the error correction mechanisms as defined in the configuration map (step ④ in FIG. 3 and steps 405 and 406 in FIG. 4). These mechanisms have allowed only a partial correction of the data, and the corrected zone 850 therefore only partially covers the erroneous zone 840 of the data 830.

The state ③ presents an example of organization of this same multimedia data, partially corrected, within a packet generated for transferring this data to the client via the extra stream. This data is preceded therein by a protection element 800 and private information 801 comprising supplementary information on the origin of the packet and the error processed by the PIC. The private information 801, collected or calculated, is organized in accordance with what was established at step 408 in FIG. 4 and the reference 730 in FIG. 7b.

The private information 801 added to the erroneous data considers various aspects of this data, in particular the following information:
  the origin 810 of the packet specifying, in accordance with the information in the configuration map (reference 731 in FIG. 7b), a means of identifying
    the original stream by its SSRC identifier (contained in the RTP header of the packet in question), specified at 811 in a reserved 32-bit zone, and
    the packet in its original stream by its sequence number, specified 812 in a reserved 16-bit zone;
  the error detected, partially corrected as well as possible 820, specifying:
    the original FEC 831 that made it possible to detect and locate the error, during step 403 in FIG. 4.
    the location 822 of the error in the original data, this field is composed of a first byte indicating the number of bytes to follow used for the location of the error and the n following bytes containing the information. The estimation of the position of the erroneous zone can be obtained during the error detection phase 402 of FIG. 4 by the error detection mechanisms, implemented in accordance with the configuration, based on the use of a quantized decision decoder, and also during the error correction phase of step 406 in FIG. 4 by the combined use of the error correction mechanisms of the ARQ type and the combination of bits in accordance with the means specified in the configuration 613 and 715 (FIGS. 6 and 7b), making it possible to obtain by comparison of the packets received the estimated position of the erroneous zone and corrected zone;
    the location in the original data and the extent of the corrected zone 823, when a partial correction has been obtained by the application of the appropriate correction mechanisms (step 406 in FIG. 4). As with the location of the erroneous zone in the original data, this field is composed of a first byte specifying the number of bytes to follow used to indicate the location of the corrected zone, the m following bytes containing the information and a last byte specifying in number of bytes the size of the zone covered by the correction. If no partial correction has been able to be made only the first byte is used with a zero value, specifying that this information is inapplicable to the data item in question. The relative position of the partial correction can be obtained simply by comparing the packet containing the best partial correction, which must be transmitted to the client, with the packet initially received before the error correction mechanisms are implemented, in accordance with the specifications of the configuration map (reference 715 in FIG. 7b).
    the description 824 of the mechanisms used for obtaining this partial correction. If no partial correction has been obtained this field is absent. In the contrary case this field consists of a first byte indicating the number of bytes to follow used for describing the mechanisms and the following x bytes containing the list of mechanisms applied designated by their acronyms (identical to those used to designate them in the configuration map, reference 613 in FIG. 6), separated by a semicolon, in their order of application.

The protection element 800, of the Reed-Solomon FEC type, is calculated at step 408 in FIG. 4, in accordance with the information supplied in the configuration map (reference 730 in FIG. 7b), so that it covers both the private information 810 and 820 and the data partially corrected as well as possible.

The data thus prepared is ready to be transmitted in the extra stream dedicated to the transfer of the erroneous data to the client in accordance with the protocol defined for this stream at 714 (FIG. 7b).

The constitution of these packets thus generated at step 408 in FIG. 4 for the transfer of the erroneous data in the extra stream may be different, in particular to allow a dynamic configuration of the means of protecting the data and the private information.

The creation of the packets can be linked to the configuration map and thus selectively and dynamically cover some of this data (the private information alone, the data alone or data segments in the corrected zone) or implement mechanisms other than FECs of the Reed-Solomon type (such as turbo codes, LDPC or repeat-accumulate).

The organization of the private information can also be different, a byte can be reserved in the "header" of this information in order to specify those present, several of them depending on the presence of a partial correction of the erroneous data.

Naturally, in order to satisfy specific requirements, a competent person in the field of the invention can apply modifications in the above description.

The invention claimed is:

1. A method for transferring at least one data packet in a network from at least one server to a client through a point of interconnection, the point of interconnection executing the method comprising:
  receiving from said client at least one configuration map, prior to transferring said at least one data packet, said configuration map being defined by said client and specifying at least one error correction mechanism;
  receiving from said server said at least one data packet;
  detecting errors included in said at least one data packet; and
  if said at least one data packet comprises at least one error, applying to said at least one data packet at least one error correction mechanism specified in said at least one configuration map.

2. The method according to claim 1 further comprising a step of transmitting to said client said at least one data packet on which said at least one error correction mechanism specified in said at least one configuration map has been applied if the result of the application of the error correction mechanism has corrected said at least one error.

3. The method according to claim 1, wherein said at least one configuration map comprises at least one selection criterion and wherein said application of said at least one error correction mechanism to said at least one data packet is carried out if said at least one data packet satisfies said at least one selection criterion.

4. The method according to claim 3 further comprising;
creating at least one new data packet comprising the data of said data packet comprising at least one error, potentially partially corrected; and
transmitting said at least one created new data packet to said client; if said data packet comprising at least one error is not entirely corrected or if said data packet is not selected according to said at least one selection criterion.

5. The method according to claim 4, wherein said at least one created new data packet is transmitted on a particular stream identified in said at least one configuration map.

6. The method according to claim 5 further comprising the implementation of at least one default error correction mechanism if said at least one received data packet comprising at least one error does not belong to a stream specified in said configuration map.

7. The method according claim 4, wherein said at least one created new data packet comprises information relating to the detection or attempt at correction of said at least one error and the identification of the data and their original stream.

8. The method according to claim 3, wherein said at least one selection criterion comprises information adapted to control at least one error management mechanism.

9. A non-transitory computer-readable storage medium on which is stored computer-executable code of a computer program comprising instructions which, when executed by a computer, causes the computer to perform each of the steps of the method according to claim 1.

10. A method for receiving at least one data packet in a network comprising at least one point of interconnection, the method comprising:
defining at least one configuration map comprising at least information adapted to enhance data packets comprising errors that have been previously detected, prior to receiving said at least one data packet;
transmitting said at least one configuration map to said at least one point of interconnection;
receiving said at least one data packet from said at least one point of interconnection; and
processing said at least one received data packet according to said information adapted to enhance data packets comprising errors that have been previously detected.

11. The method according to claim 10, wherein said at least one configuration map further comprises information adapted to identify data packets, and wherein said method further comprises a step of identifying said at least one received data packet according to said information adapted to identify data packets, said at least one received data packet being processed if said at least one received data packet is identified.

12. The method according to claim 11, wherein said information adapted to identify data packets comprises an identifier of at least one additional stream.

13. The method according to claim 10, wherein said at least one received data packet comprises information relating to at least one error detection or correction mechanism previously implemented on at least some of the data of said at least one received data packet according to said information adapted to enhance data packets comprising errors that have previously been detected.

14. A device for a point of interconnection for transferring at least one data packet in a network from at least one server to a client through said point of interconnection, the device comprising:
a first receiving unit that receives from said client at least one configuration map, prior to transferring said at least one data packet, said configuration map being defined by said client and specifying at least one error correction mechanism;
a second receiving unit that receives from said server said at least one data packet;
a detecting unit that detects errors in said at least one data packet; and
an applying unit that applies to said at least one data packet at least one error correction mechanism specified in said at least one configuration map if said received at least one data packet comprises at least one error.

15. The device according to claim 14 further comprising a transmitting unit that transmits to said client said data packet, to which said at least one error correction mechanism specified in said at least one configuration map has been applied, if the result of the application of the ate least one error correction mechanism has corrected said at least one error.

16. The device according to claim 14 further comprising a selecting unit that selects said at least one data packet according to at least one selection criterion of said at least one configuration map, said at least one error correction mechanism being applied to said at least one data packet if said at least one data packet is selected.

17. The device according to claim 16 further comprising:
a creating unit that creates at least one new data packet comprising the data of said data packet received and selected, comprising at least one error, if said data packet received and selected comprising at least one error has not been entirely corrected; and
a transmitting unit that transmits said created at least one new data packet to said client.

18. The device according to claim 17, wherein said created at least one new data packet is transmitted on a particular stream identified in said at least one configuration map.

19. The device according to claim 17, wherein said created at least one new data packet comprises information relating to the attempt at correcting said at least one error and to the identification of the data and its original stream.

20. A device for receiving at least one data packet in a network comprising at least one point of interconnection, the device comprising,
a defining unit that defines at least one configuration map comprising at least information adapted to enhance data packets comprising errors that have been previously detected, prior to receiving said at least one data packet;
a transmitting unit that transmits said at least one configuration map to said at least one point of interconnection;
a receiving unit that receives said at least one data packet from said at least one point of interconnection; and
a processing unit that processes said at least one received data packet according to said information adapted to enhance data packets comprising errors that have previously been detected.

21. The device according to claim 20, wherein said configuration map further comprises information adapted to identify data packets, the device further comprising an identifying unit that identifies said at least one received data packet according to said information adapted to identify data packets, said at least one received data packet being processed if said at least one received data packet is identified.

* * * * *